UNITED STATES PATENT OFFICE.

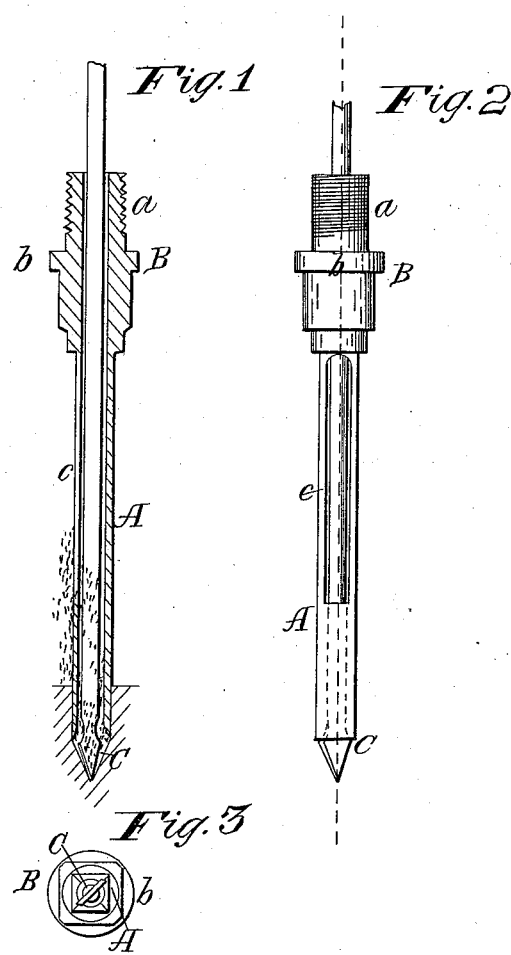

A. C. HITCHCOCK AND C. H. AMIDON, OF GREENFIELD, MASSACHUSETTS.

MORTISING-TOOL.

Specification of Letters Patent No. 14,454, dated March 18, 1856.

*To all whom it may concern:*

Be it known that we, A. C. HITCHCOCK and C. H. AMIDON, of Greenfield, in the county of Franklin and State of Massachusetts, have invented a new and Improved Mortising-Tool; and we do hereby declare that the following is a full, clear, and exact description of the same, reference being had to the annexed drawings, making a part of this specification, in which—

Figure 1, is a longitudinal section of our improvement. Fig. 2, is an external view of ditto. Fig. 3, is an end view of ditto.

Similar letters of reference indicate corresponding parts in the several figures.

Our invention consists in placing a bit of peculiar construction within a hollow chisel of square or rectangular form, said chisel having a slot made through one of its sides to allow the dust to escape, as will be presently shown and described.

To enable others skilled in the art to fully understand and construct our invention, we will proceed to describe it.

A, represents a square or rectangular steel bar which is hollow, and has its inner sides at one end beveled, so as to form cutting edges, see Fig. 1. The opposite end of the bar A, has a head B, upon it, said head having a screw thread (*a*) and shoulder (*b*) upon it. One side of the bar or chisel A, has an oblong slot (*c*) made through it. The bore of the bar A, is circular and extends through the head B.

*c*, is a bit the shank of which is fitted within the bar or chisel A, and is allowed to turn freely therein. The cutting edges of the bit are formed similarly to drills for drilling metal, as plainly shown in Figs. 1 and 2, the head of the bit being of triangular form. The shape of the head however may vary in form, the cutting edges being the important point to be considered. The bit is rotated within the bar or chisel A. The bit *c*, enters the wood and in cutting takes off small chips from the wood like dust. This dust passes out of the bar or chisel A through the slot *c*. The bar or chisel is forced into the wood, the cutting edges following the bit and making a rectangular hole.

The tool may be attached to any proper device, or operated in any proper manner.

We are aware that tools similarly constructed have been previously used for the same purpose, but screw auger bits have been employed and the tools consequently operated imperfectly as the hollow chisels would soon become clogged with chips, the auger bits cutting off large chips. By our improvement this difficult is obviated.

We do not claim a hollow chisel having a bit placed within it irrespective of the form of bit used, and the slotted chisel.

What we do claim therefore as new and desire to secure by Letters Patent, is,

The combination of the bit *c*, constructed as described with the hollow slotted chisel A, for the purpose set forth.

A. C. HITCHCOCK.
    C. H. AMIDON.

Witnesses:
 JAMES S. GREENWELL,
 W. W. CLAPP.